No. 639,567. Patented Dec. 19, 1899.
H. F. HENDERSON.
BICYCLE.
(Application filed Jan. 25, 1899.)
(No Model.)

WITNESSES:

INVENTOR
Henry F. Henderson
BY
ATTORNEYS.

UNITED STATES PATENT OFFICE.

HENRY FRANKLIN HENDERSON, OF AMES, COLORADO.

BICYCLE.

SPECIFICATION forming part of Letters Patent No. 639,567, dated December 19, 1899.

Application filed January 25, 1899. Serial No. 703,357. (No model.)

*To all whom it may concern:*

Be it known that I, HENRY FRANKLIN HENDERSON, of Ames, in the county of San Miguel and State of Colorado, have invented a new and Improved Bicycle, of which the following is a full, clear, and exact description.

This invention relates particularly to driving mechanism for bicycles; and the object is to provide a simple mechanism whereby a great speed may be maintained by a comparatively small amount of labor or exertion on the part of the rider after once starting the bicycle.

I will describe a bicycle embodying my invention, and then point out the novel features in the appended claim.

Reference is to be had to the accompanying drawings, forming a part of this specification, in which similar characters of reference indicate corresponding parts in all the figures.

Figure 1:
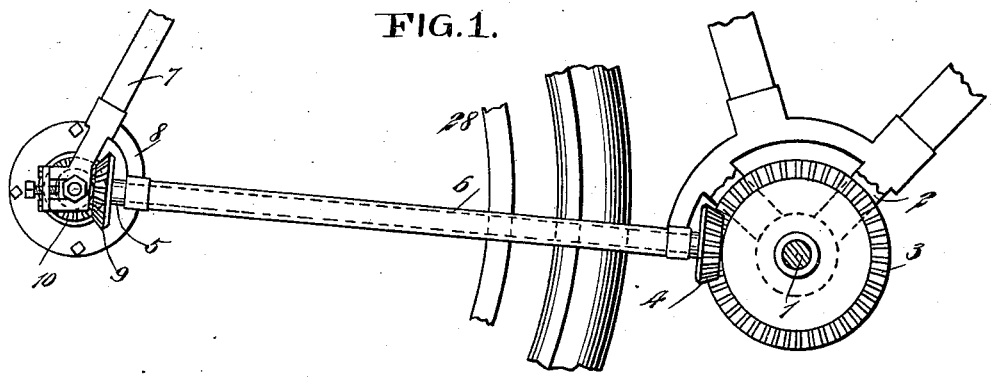
Figure 2:
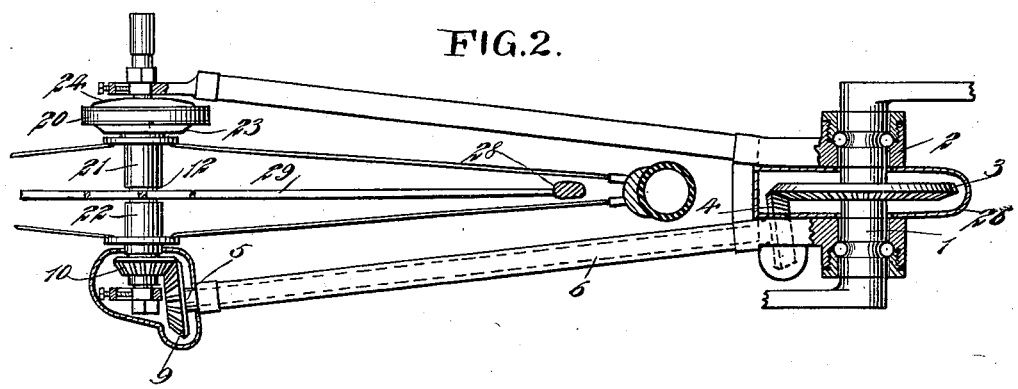
Figure 3:
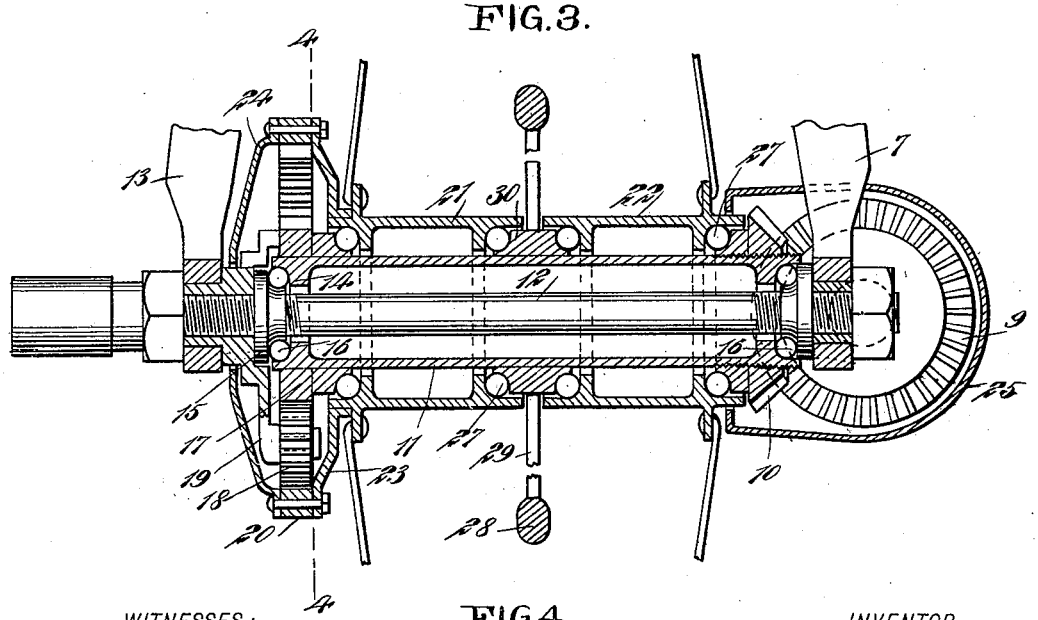
Figure 4:
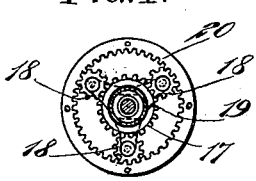

Figure 1 is a side elevation of a driving mechanism embodying my invention. Fig. 2 is a plan view thereof. Fig. 3 is a sectional view of the rear-wheel hub and its gear connections; and Fig. 4 is a section through the line 4 4 in Fig. 3, but drawn on a smaller scale.

Referring to the drawings, 1 designates the pedal-shaft, having bearings in the hanger 2, and to the center of this shaft 1 is affixed a bevel driving-gear 3, meshing with a bevel-pinion 4, mounted on the forward end of the shaft 5, extended through and having a bearing in the bottom brace 6 of the bicycle-frame. The rear end of the bottom brace 6 is supported from the rear fork member 7 by means of a strap 8.

Affixed to the rear end of the shaft 5 is a bevel-pinion 9, meshing with a bevel-pinion 10, mounted on a driving hub or sleeve 11, which is mounted to rotate on the fixed spindle 12, attached in the usual manner to the fork members 7 and 13. At its ends the driving hub or sleeve has a raceway 14, and adjustably mounted on the spindle 12 are bearing-cones 15, and arranged between the bearing-cones and the raceways 14 are bearing-balls 16.

Affixed to one end of the driving hub or sleeve 11 is a gear-wheel 17, with which a series of pinions 18 engage. These pinions 18 are mounted to rotate on arms 19, having rigid connection with the spindle 12. These pinions 18 also mesh with an interiorly-toothed gear or ring 20, which is attached to the rear-wheel hub, consisting of the two sections 21 and 22. As here shown, a flange 23 extends outward from the rear-wheel hub, and to this flange is bolted the gear or ring 20, and to the outer side of the gear-ring 20 is secured a cap 24, which loosely surrounds the hub to which the arms 19 are attached. These parts 23 and 24 not only support the gear or ring 20, but they provide the walls of a case to prevent the entrance of dirt or dust to the gearing. It may be here stated that a suitable boxing 25 is provided to protect the gears 9 and 10 from dust and dirt, and a boxing 26 is provided to protect the wheels 3 and 4. Suitable ball-bearings 27 are arranged between the rear-wheel-hub sections and the driving hub or sleeve 11.

A fly-wheel is rigidly connected to the center of the driving hub or sleeve 11. This fly-wheel consists of a heavy ring 28, having spokes 29, extended to a hub 30, secured to the driving hub or sleeve, and this fly-wheel is arranged between the spokes of the driving-wheel. It is obvious that there will be no danger of its making contact with the clothing of a rider or that any danger will result from the rotation of the fly-wheel. In operation when motion is imparted to the pedal-shaft the driving hub or sleeve will be rotated in a backward direction, carrying the fly-wheel, and at the same time the wheel-hub 22 will be rotated in a forward direction, which is due to the arrangement of gearing described. It is obvious that when the bicycle is once started the fly-wheel, being in rapid rotation, will give a steadying action to the bicycle and aid in carrying the pedals over dead-centers, thus relieving the rider from a considerable amount of exertion applied to the pedals, and thus a high rate of speed may be maintained without unduly tiring the rider.

Having thus fully described my invention, I claim as new and desire to secure by Letters Patent—

A driving mechanism for a bicycle, comprising a fixed spindle for the rear wheel, a driving hub or sleeve mounted to rotate on said spindle, a bevel-gear on one end of said driving-hub, a shaft having bevel-gear connection with the crank-shaft of the bicycle and also having bevel-gear engagement with the first-named bevel-gear, casings in which the bevel-gears are inclosed, a rear-wheel hub mounted on the driving-hub and consisting of two sections, a fly-wheel rigidly mounted on the driving-hub, the spokes of said flywheel being extended outward between the inner adjacent ends of the wheel-hub sections and also being extended between the spokes of said rear wheel, a gear-wheel on the end of the driving-hub opposite to that to which the bevel-gear is attached, an interiorly-toothed gear secured to an annular flange on the end of the rear-wheel hub, arms extended rigidly from the fixed spindle, and pinions mounted to rotate on said arms and engaging with the gear on the end of the driving-hub, and also with said interior gear whereby the driving-hub and the fly-wheel will be operated or rotated in a direction opposite to that of the rear-wheel hub, thus steadying the action of the bicycle and carrying the pedals over dead-centers, substantially as specified.

HENRY FRANKLIN HENDERSON.

Witnesses:
 JNO. A. KNIGHT,
 W. S. CARHART.